C. P. STEINMETZ.
VAPOR RECTIFIER SYSTEM.
APPLICATION FILED SEPT. 25, 1905.
1,097,062.
Patented May 19, 1914.
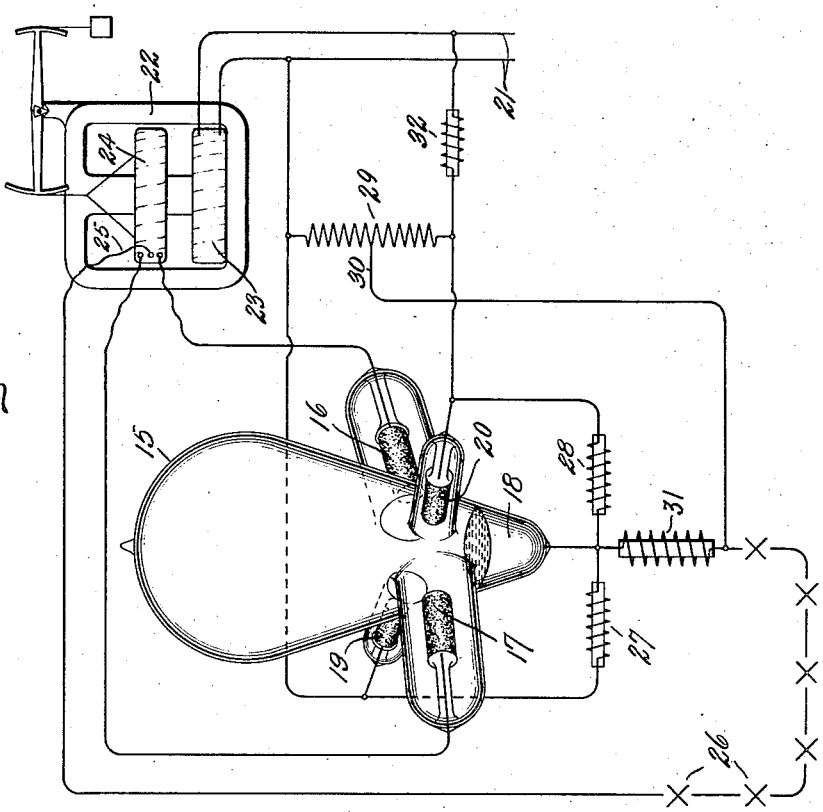
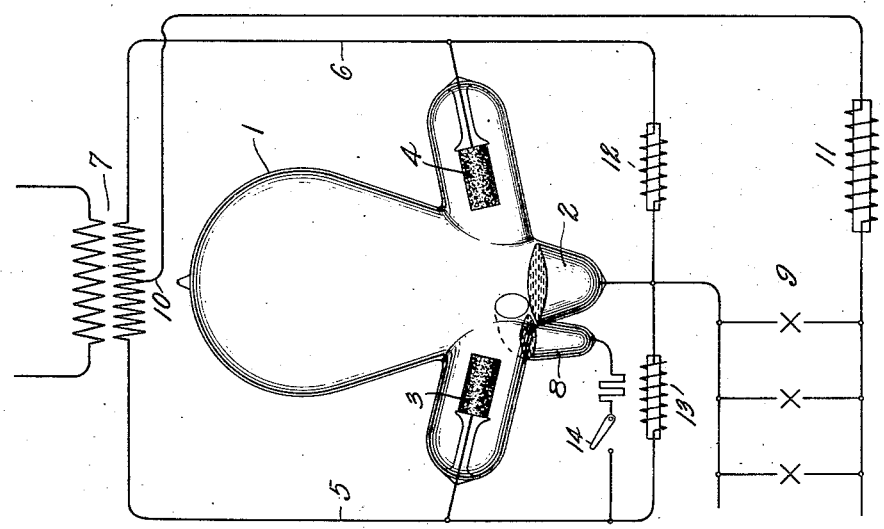
WITNESSES:
INVENTOR:
Charles P. Steinmetz,
By Albert ... 
Att'y.

UNITED STATES PATENT OFFICE.

CHARLES P. STEINMETZ, OF SCHENECTADY, NEW YORK, ASSIGNOR TO GENERAL ELECTRIC COMPANY, A CORPORATION OF NEW YORK.

VAPOR-RECTIFIER SYSTEM.

1,097,062.

Specification of Letters Patent.

Patented May 19, 1914.

Application filed September 25, 1905. Serial No. 279,939.

*To all whom it may concern:*

Be it known that I, CHARLES P. STEIN-METZ, a citizen of the United States, residing at Schenectady, county of Schenectady, State of New York, have invented certain new and useful Improvements in Vapor-Rectifier Systems, of which the following is a specification.

This invention relates to systems of electrical distribution in which mercury rectifiers are utilized to convert alternating current into unidirectional current and comprises an improved means for exciting such rectifiers so as to maintain them continuously conductive for current from the source.

When a rectifier is operating on an alternating current source, alternate half waves of current are delivered through the arc to the vaporizable cathode by different anodes, and unless some special means is provided for bridging over the so-called dead points in the current waves, these alternate currents from the anodes will not maintain the rectifier in a conductive condition. I employ reactance coils in shunt with the rectifier arcs in such a way that energy is stored in the reactance coils and subsequently delivered to the rectifier anodes to maintain a flow of current through the rectifier during intervals when current would ordinarily not be supplied from the source. Such a system of excitation is applicable to either constant potential or constant current rectifiers.

Figure 1 shows a mercury rectifier provided with reactance coils in shunt with the arcs, and operating on a constant potential circuit; Fig. 2 shows a rectifier supplying substantially constant current, and provided with a pair of auxiliary anodes excited from a constant potential source and provided with shunting reactances.

In Fig. 1 the rectifier tube 1 comprises an evacuated chamber of glass or other suitable material, a mercury cathode 2, and a plurality of solid anodes 3 and 4 connected directly to the terminals 5 and 6 of a transformer 7 or other source of alternating current. The rectifier is also provided with an auxiliary mercury anode 8, located in proximity to the cathode 2, and capable of making contact therewith to start the rectifier into operation, as will be readily understood by a person skilled in the art. A consumption circuit 9 receives current from the cathode 2, and is provided with a return path to a central tap 10 of the alternating current source 7. This consumption circuit may include a plurality of translating devices such as arc or incandescent lamps, and it may also include a reactance coil 11, or the translating devices themselves may possess a considerable amount of reactance so as to oppose any tendency of the reactances 12 and 13 hereinafter mentioned, to discharge through the consumption circuit. A reactance coil 12 is connected between anode 4 and cathode 2, and is consequently in shunt with the arc which is normally formed between these two electrodes. Similarly, a reactance 13 is in shunt with the arc which extends between anode 3 and cathode 2.

To start the apparatus a switch 14 is closed to connect anode 8 with the alternating current lead 5, and the rectifier tube 1 is shaken to establish a momentary contact between the two mercury electrodes, thereby forming an arc in the lower end of the tube and starting the tube into operation. Thereafter current will flow alternately from anodes 3 and 4 to cathode 2 and then through the consumption circuit 9 back to the source 7. A current wave from anode 3 will not however return to the source entirely through the consumption circuit 9, but a part will return through reactance 12, thus storing a certain amount of energy in the reactance which is given up later in the form of a discharge from anode 4 to cathode 2, which discharge is sufficiently out of phase with the original arc between anode 3 and the cathode to bridge over the dead point. In shunt with this discharge path of the reactance coil is a metallic circuit made up by the lead 6, half of the transformer secondary 7, reactance 11 and the translating devices in the consumption circuit, but owing to the relatively high impedance of this path substantially no current will flow therein from the reactance 12. Reactance 13 operates similar in all respects to reactance 12, except that it is energized by current from the other anode. The reactance coils 12 and 13 are preferably wound for comparatively low currents so that the consumption of energy to maintain the rectifier in a conductive condition is negligible. The reactance coils 12 and 13 are not traversed by the load current and will maintain the tube in a conductive condition irrespective of whether the consumption circuit is open or closed which feature I consider of importance as it prevents the rectifier from going out in case of an accidental or momentary open circuit in the load.

Fig. 2 shows a rectifier 15, provided with anodes 16 and 17 and a mercury cathode 18 and also provided with auxiliary anodes 19 and 20 for the purpose hereinafter set forth. The rectifier receives energy from a constant potential source 21 through a constant current transformer 22 of a well-known type having a stationary primary coil 23 and a movable secondary 24. This last named coil has its terminals connected to the anodes 16 and 17, and is provided with a central tap 25 connected through a plurality of translating devices 26 to the rectifier cathode 18. The auxiliary anodes 19 and 20 are connected to a constant potential source 21 and are also connected to a cathode 18 and to reactance coils 27 and 28. A reactance coil 29 is connected across the constant potential source 21, and is provided with a central tap 30 connected through a reactance 31 to the mercury cathode 18. A steadying reactance 32 may be introduced in one of the anode leads between the source 21 and the reactance coil 29. To start the tube into operation it is shaken until a momentary contact is established between the mercury and one of the anodes thereby producing an arc, after which the tube is self-maintaining. A wave of current passing to cathode 18 from anode 19 returns to the reactance coil 29 by way of the reactance 31 and tap 30, and also by way of reactance 28, thus storing in the last named reactance a certain amount of energy which is given up in the form of a current discharge having a certain phase displacement with respect to the original current flow. This discharge of current occurs entirely through the rectifier tube from anode 20 to cathode 18 and does not pass through the metallic parallel circuit including reactance 31 by which its passage is opposed. This discharge of the reactance coil 28 serves to bridge over the dead point, and so maintains a continuous arc at the cathode 18, and consequently insures a conductive path for current from either of the main anodes 16 and 17. Inasmuch as the excitation is independent of the load the latter may be varied at will, and may even be opened without putting out the rectifier, as the anodes 19 and 20 and their coöperating reactances will continue to deliver current to the cathode 18.

What I claim as new and desire to secure by Letters Patent of the United States, is:

1. The combination of a source of alternating current, a vapor electric device traversed by said current, reactances connected in shunt with said rectifier, a circuit connecting said reactances to the source of current and an impedance device in said circuit, proportioned to substantially prevent a discharge of said reactances through said circuit.

2. The combination of a source of alternating current, a mercury vapor rectifier traversed by said current and having a plurality of anodes and a cathode, reactance devices connected respectively to said anodes and to said cathode, a consumption circuit connected between said reactance devices and said source, and an impedance device included in said circuit for reducing the discharge of said reactance devices through said consumption circuit.

3. The combination of a vapor electric device having a cathode, a plurality of main anodes, and a plurality of auxiliary anodes, means for supplying current to said rectifier, a load circuit, reactance devices connected respectively to said auxiliary anodes and said cathode, circuit connections between reactances and said source, and an impedance device in the circuit between said reactance devices and the source to reduce the discharge of said reactances in said circuit.

In witness whereof, I have hereunto set my hand this 21st day of September, 1905.

CHARLES P. STEINMETZ.

Witnesses:
HELEN ORFORD,
G. C. HOLLISTER.